US005797252A

United States Patent [19]
Goman

[11] Patent Number: 5,797,252
[45] Date of Patent: Aug. 25, 1998

[54] HEIGHT OF CUT ADJUSTMENT MECHANISM

[75] Inventor: Gerald Eugene Goman, Horicon, Wis.

[73] Assignee: Deere & Company, Moline, Ill.

[21] Appl. No.: 645,366

[22] Filed: May 13, 1996

[51] Int. Cl.⁶ ............................................. A01D 34/64
[52] U.S. Cl. .................... 56/17.2; 56/14.9; 56/DIG. 9; 56/DIG. 14
[58] Field of Search .................... 56/128, 17.1, 17.2, 56/16.9, 249, 252, 294; 280/43.2, 43.13, 43.17

[56] References Cited

U.S. PATENT DOCUMENTS

| | | | |
|---|---|---|---|
| 3,099,124 | 7/1963 | Strasel | 56/17.2 X |
| 4,028,868 | 6/1977 | Zehrung, Jr. | 56/17.2 |
| 4,320,616 | 3/1982 | Marto | 56/17.2 X |
| 4,321,785 | 3/1982 | Kaland | 56/17.2 |
| 4,441,306 | 4/1984 | Kuhn . | |
| 4,715,168 | 12/1987 | Oxley | 56/17.2 X |
| 5,065,568 | 11/1991 | Braun et al. | 56/14.9 |
| 5,203,151 | 4/1993 | Mitts | 56/17.2 |

OTHER PUBLICATIONS

The Toro Company, brochure entitled "Toro Groundsmaster 455-D", 3 pages, dated 1994, published in the U.S.A.

Primary Examiner—Michael J. Carone
Assistant Examiner—Robert Pezzuto

[57] ABSTRACT

A mechanism for adjusting the cutting height of a mower deck, which includes a four bar linkage with a pair of beam members, a rod member extending between the two beams. Rotation of the rod by the operator causes the beams to shift relative to each other, which causes the four bar linkage to raise or lower the mower deck. A projecting member is biased toward engagement with a detent formed in the rod member for securing the mower deck at the selected cutting height, and allows the operator to sense when the projecting member rides past the detent as the cutting height is incrementally adjusted.

11 Claims, 2 Drawing Sheets

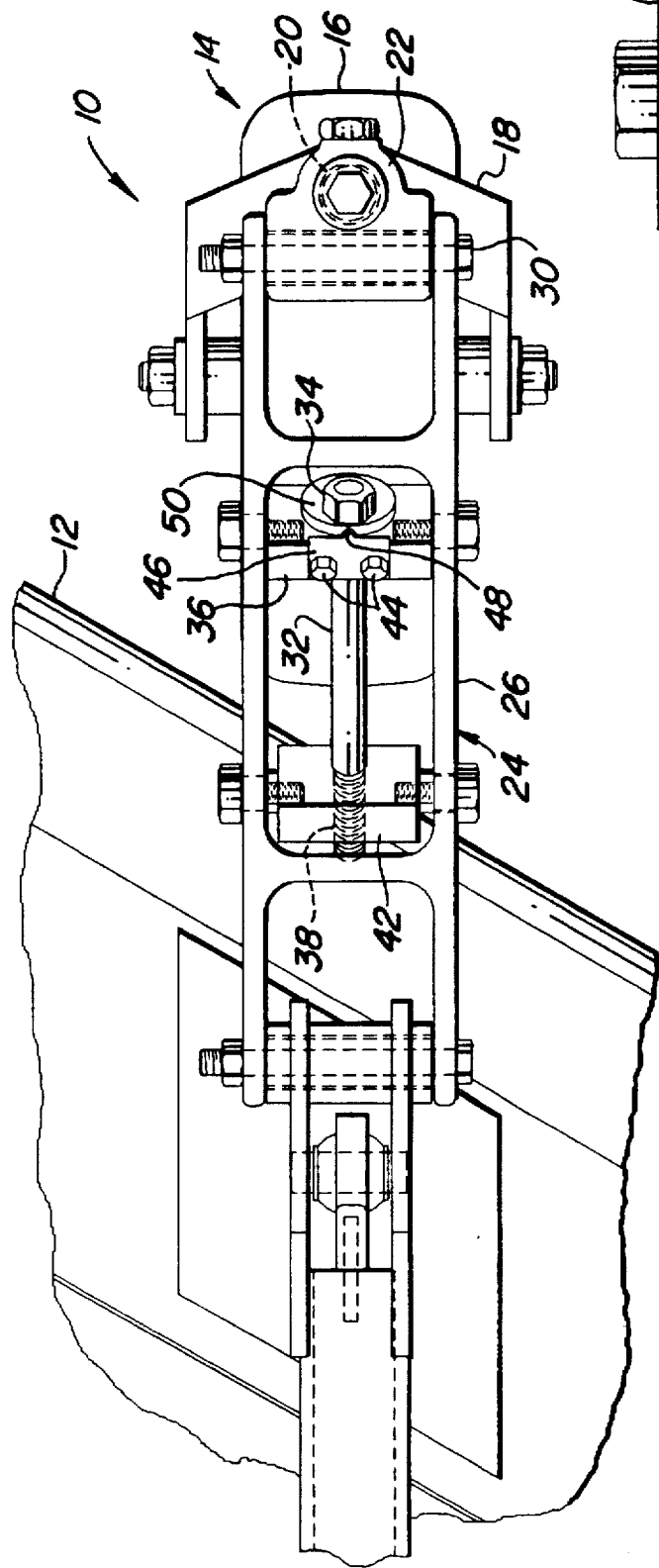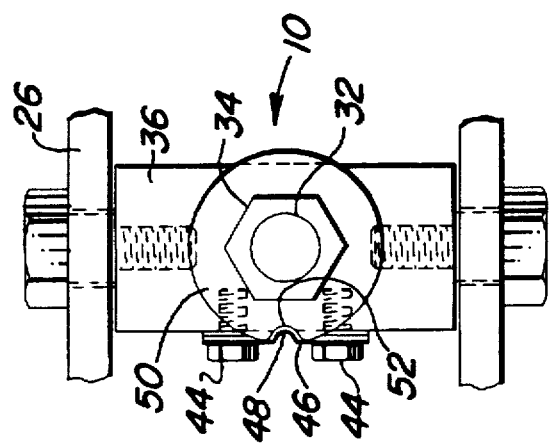

HEIGHT OF CUT ADJUSTMENT MECHANISM

FIELD OF THE INVENTION

The present invention relates to mechanisms which allow an operator to adjust the cutting height of an implement such as a mower deck.

BACKGROUND OF THE INVENTION

Conventional mowers include a blade which rotates within a housing or deck for cutting grass as the mower deck travels forwardly. The mower decks are typically coupled with a vehicle for being propelled forwardly. Caster wheels are typically mounted to the deck for supporting the deck as the caster wheels roll across the ground. These mower decks are often provided with a mechanism for adjusting the vertical height of the mower deck above the ground such that the height at which the grass is cut can be adjusted.

One type of conventional cutting height adjustment mechanism provides a plurality of washers that can be stacked on the pivotal shafts of the caster wheels for altering the height at which the deck is supported by the caster wheels. By increasing the number of washers stacked on the pivot shaft of the caster wheel, the deck will be raised to a higher cutting height. Decreasing the number of washers stacked on the pivot shaft will act to lower the deck for shorter cutting heights. These height adjustment mechanisms require that the operator partially disassemble the caster wheel mounting structure in order to add or remove washers from the pivot shaft of the caster wheel. This proccess can be relatively time consuming, and can cause an undesirable interruption to mowing operations. The addition or removal of washers provides for an incremental adjustment of the cutting height, but these mechanisms typically do not inform the operator of the height at which the deck is set. Furthermore, the decks are typically supported by a number of caster wheels at various locations around the deck. Therefore, the operator may be unsure if the deck is level after adding or removing washers at the various locations of the caster wheels.

Another type of conventional height adjustment mechanism provides a hand engagable lever or other mechanism for altering the height of the deck. These mechanisms typically raise and lower the deck such that the deck remains level. These mechanisms tend to be relatively complex and have a relatively large number of parts, which raises the cost of manufacturing and assembling the mechanism.

Therefore, it would be desirable to provide a mower deck height of cut adjustment mechanism which allows the operator to quickly change the cutting height such that only a brief interruption of mowing operations is required. It would be desirable for such a mechanism to be relatively simple in construction and utilize relatively few parts such that manufacture and assembly costs are reduced. It would also be desireable for such a mechanism to allow the operator to raise the cutting height in increments, and such that the operator can easily determine how far he has adjusted the cutting height and whether the deck is generally level.

SUMMARY OF THE INVENTION

The present invention provides a mechanism for adjusting the cutting height of a mower deck. A caster wheel is coupled to a mower deck via a four bar linkage which includes a pair of beams. A rod member is received by first and second mounting blocks pivotally coupled to respective beams. The rod includes a hex shaped nut on one end and a threaded portion on the opposite end. The threads engage the second mounting block such that the second mounting block will shift along the axis of the rod as the operator rotates the rod. Movement of the mounting blocks relative to one another causes a corresponding movement of the beams relative to each other. This causes the beams to pivot about their connections with the mower deck. When the operator rotates the rod in a first direction the mounting blocks will shift away from each other, causing the beams to swing downwardly with respect to the caster wheel and thereby lowering the deck to a shorter cutting height. When the operator rotates the rod in the opposite direction, the mounting blocks will shift toward each other, causing the beams to swing upwardly with respect to the caster wheel, thereby raising the deck to a higher cutting height. A leaf spring member is provided having a projecting portion which is biased by the leaf spring toward abutment with a flange portion of the nut. A detent portion defined in the flange is adapted to receive the projecting portion each time the nut and rod make a single revolution. The operator can feel and hear the projecting member clicking into the detent as he rotates the nut and rod member. The cutting height is adjusted one-quarter inch for each revolution of the nut and rod member. Therefore, by counting how many times the projecting member engages the detent, the operator can therefore determine how far he adjusts the cutting height. A mechanism is also provided for visually indicating to the operator the cutting height at which the deck is being supported by the caster wheel.

BRIEF DESCRIPTION OF THE DRAWINGS

FIG. 2 is a plan view of the mower deck height adjustment mechanism according to the present invention.

FIG. 3 is an end view of the nut and rod members of the cutting height adjustment mechanism according to the present invention.

DETAILED DESCRIPTION OF THE PREFERRED EMBODIMENT

Figure 1:
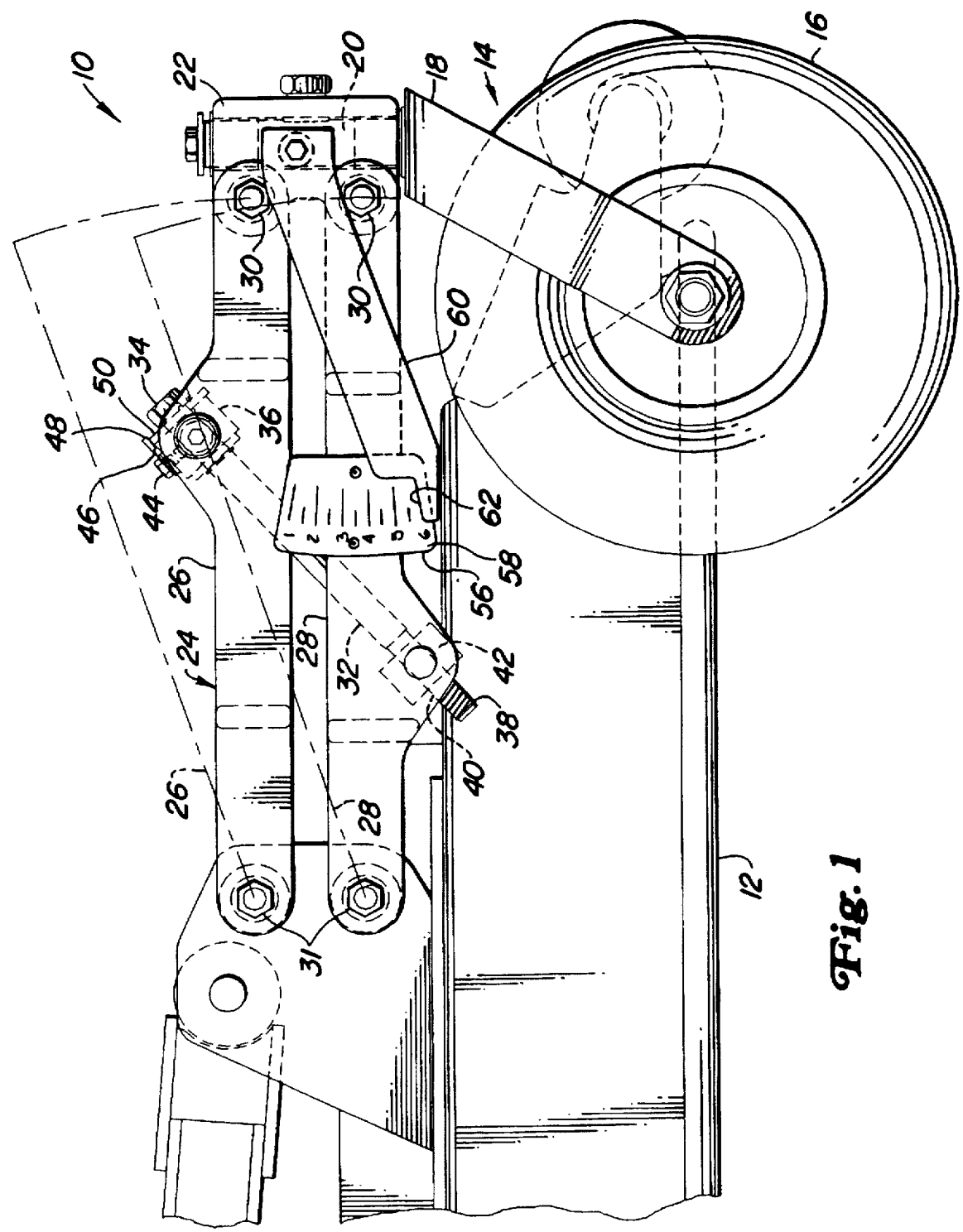
FIG. 1 is side view of a cutting height adjustment mechanism according to the present invention, showing the mower deck in a raised position in solid lines and in a lowered position in phantom.

Referring now to FIGS. 1–3, there is shown the preferred embodiment of the cutting height adjustment mechanism 10 according to the present invention. A mower deck 12 is provided for rotatably supporting a mower blade for cutting grass within the mower deck 12. The mower deck 12 is coupled by conventional means such as a four bar linkage (not shown) to a vehicle (not shown). A caster wheel assembly 14 includes a ground engaging tire 16, a fork member 18 and a vertically extending shaft member 20. The shaft 20 is pivotally received within a mounting member 22. The mounting member 22 is coupled to the mower deck 12 via a four bar linkage 24. The four bar linkage 24 includes a pair of beam members 26 and 28 which are pivotally coupled to the mounting member 22 and mower deck 12 by a plurality of bolt members 30 and 31. These four bar linkages between the vehicle and the mower deck 12, and between the mower deck 12 and the caster wheels 14 serve to maintain the deck 12 in a level configuration regardless of the height at which the deck 12 is operating.

The present invention provides a mechanism 10 for adjusting the height of the mower deck 12 above the ground. The height at which grass is cut is thereby adjustable.

A rotatable member or rod member 32 having a hex shaped nut or head portion 34 rigidly fixed therewith is rotatably received by a first mounting block 36 pivotally supported by the upper beam member 26. The rod 32 includes a threaded end portion 38 which is received within an opening 40 in a second mounting block 42 pivotally supported by the lower beam 28. The second mounting block 42 engages the threads 38 of the rod member 32. A pair of bolts 44 fix an abutment member or leaf spring member 46 to the first mounting block 36. The leaf spring 46 includes a projecting portion 48 which is biased by the leafspring 46 toward abutment with a flange portion 50 of the nut 34. The flange 50 includes a detent or notch 52 adapted to engage and receive the projecting portion 48 of the leaf spring 46. The projecting member 48 and notch 52 thereby define interlocking or mating shapes.

Next, the operation of the preferred embodiment will be described in greater detail. To adjust the height of the mower deck 12 above the ground, the operator rotates the nut portion 34 of the rod member 32. As the rod 32 rotates with the nut member 34, the second mounting block 42 engaged with the threads 38 of the rod 32 will be caused to shift along the axis of the rod 32 either toward or away from the nut portion 34, depending on which direction the operator is rotating the nut 34. Shifting of the second mounting block 42 serves to move the upper and lower beam members 26 and 28 either toward or away from each other. Changes in the relative locations of the upper and lower beams 26 and 28 will cause the beams 26 and 28 to pivot about the bolts 31 coupled with the deck 12, and also about the bolts 30 coupled with the mounting member 22. For example, as the operator rotates the nut 34 in a counter-clockwise direction as viewed in FIG. 3, the threads 38 of the rod 32 will cause the second mounting block 42 to shift away from the nut 34 and first mounting block 36. The mounting blocks 36 and 42 are fixed with the respective first and second beams 26 and 28, and therefore movement of the mounting blocks 36 and 42 will be accompanied by a corresponding movement of the beams 26 and 28. As the mounting blocks 36 and 42 shift away from each other, the points on the beams 26 and 28 at which the mounting blocks 36 and 42 are mounted will also shift away from each other. The end portions of the beams 26 and 28 are pivotally fixed to the deck 12 via the bolts 31, and therefore, as the mounting blocks 36 and 42 shift apart from each other and the respective points on the beams 26 and 28 shift away from each other, the beams 26 and 28 will pivot upwardly with respect to the deck 12 to the position shown in phantom in FIG. 1. The front portions of the beams 26 and 28 are pivotally fixed to the caster wheel 14, and therefore the beams 26 and 28 pivot downwardly with respect to the caster wheel 14. This has the the effect of lowering the mower deck 12 to a lower cutting height as the operator turns the nut portion 34 in a counterclockwise direction. On the other hand, as the operator rotates the nut 34 in the clockwise direction as viewed in FIG. 3, the threads 38 of the rod 32 will cause the second mounting block 42 to shift toward the nut 34 and first mounting block 36. Since the mounting blocks 36 and 42 are mounted to the beams 26 and 28, shifting of the mounting blocks 36 and 42 will be accompanied by a corresponding shifting of the beams 26 and 28. As the mounting blocks 36 and 42 shift toward each other, the points on the beams 26 and 28 at which the mounting blocks 36 and 42 are mounted will also shift toward each other. As the mounting blocks 36 and 42 shift toward each other and the respective points on the beams 26 and 28 shift toward each other the beams 26 and 28 will pivot downwardly with respect to the deck 12 until they reach the position shown in solid lines in FIG. 1. Since the front portion of the beams 26 and 28 are pivotally coupled with the mounting member 22 of the caster wheel 14, the beams 26 and 28 will pivot upwardly with respect to the caster wheel 14. This has the effect of raising the mower deck 12 to a higher cutting height as the operator turns the nut portion 34 in a clockwise direction.

The present invention also allows the operator to sense how far he has changed the cutting height of the deck 12. With each revolution of the nut member 34, the projecting portion 48 of the leaf spring 46 engages the detent 52 formed in the flange 50 of the nut member 34. The operator can feel and hear the clicking of the projecting member 48 into engagement with the detent 52. Each revolution of the nut 34 and rod member 32 corresponds to approximately a one-quarter inch change in the height of the deck 12 above the ground. Therefore, the operator can count the clicks as he rotates the nut 34 and know the height to which he has adjusted the deck 12. The other caster wheels which support the deck 12 can also be provided with the present invention, which will allow the operator to count the rotations of those nut members 34 when he adjusts the height of the deck 12 at each location. The operator can thereby rotate each nut 34 the same number of revolutions such that the deck 12 is adjusted to the desired height at all caster wheel locations, thereby maintaining the deck 12 in a level configuration.

The projecting member 48 is biased against the flange portion 50 by the flexing of the leaf spring 46. The projecting member 48 and detent 52 have curved shapes such that the detent 52 can shift past engagement with the projecting member 48 relatively easily as the operator applies a rotative force to the nut 34. However, the detent 52 and projecting member 48 are large enough to secure the nut 34 firmly in place when the projecting member 48 is received by the detent 52. The mower deck 12 is thereby held at the selected cutting height by the engagement of the projecting member 48 with the detent 52.

An indicator mechanism 54 is also provided for visually indicating to the operator the height at which the deck 12 is riding at each caster wheel location. A plate 56 is coupled with the lower beam 28. Fixed to the plate 56 is a decal 58 showing an array of numbers. A pointer arm 60 is coupled with the mounting member 22 and extends rearwardly to a position proximate the plate 56. As the deck 12 is adjusted up and down, the plate 56 shifts relative to the pointer 60. The edge 62 of the pointer 60 is positioned adjacent the number on the decal 58 which corresponds to the cutting height of the deck 12 in inches. The pointer 60 and plate 56 thereby allow the operator to visually verify the cutting height of the deck 12.

I claim:

1. A mechanism for adjusting the operating height of an implement, comprising:

a rotatable member operatively coupled with the implement for adjusting the operating height of the implement as the rotatable member is rotated by an operator, an abutment member fixedly positioned adjacent the rotatable member, said abutment member and rotatable member defining generally mating shapes which engage each other as the rotatable member rotates to a particular position for indicating to the operator an incremental height adjustment of the implement, said abutment member is resiliently biased toward the rotatable member in a radial direction with respect to an axis of rotation of the rotatable member for pressing the mating shape of the abutment member toward the rotatable member and into engagement with the mating shape of the rotatable member said abutment member further comprises a leaf spring member having a mating shape defined therein, said leaf spring member serving to bias the mating shape of the leaf spring toward the rotatable member and into engagement with the mating shape defined by the rotatable member, and the rotatable member is operatively coupled with a link member coupled between a pair of beam members which form part of a four bar linkage for supporting the implement, and said link member adjusts the relative position of the beam members as the rotatable member is rotated by the operator to thereby adjust the operating height of the implement.

2. The invention of claim 1, wherein the rotatable member further comprises a nut member having a detent formed therein, the abutment member further includes a projecting portion which is received by the detent of the nut member for indicating to the operator the incremental height adjustment of the implement.

3. The invention of claim 1, wherein a single mating shape is formed in the rotatable member such that the mating shapes engage each other not more than once for each revolution of the rotatable member.

4. The invention of claim 1, wherein the rotatable member is rigidly fixed to a rod member which is operatively coupled between the beam members, and the rod member adjusts the relative position of the beam members to adjust the operating height of the implement as the operator rotates the rotatable member.

5. The invention of claim 4, wherein the rod member includes a threaded portion operatively engaged with one of the beams and which shifts the beams relative to each other as the rod rotates with the rotatable member.

6. A mechanism for adjusting the cutting height of a mower deck, comprising:

a nut member operatively coupled with the mower deck for adjusting the operating height of the mower deck as the nut member is rotated by an operator, and said nut member includes a detent formed therein, an abutment member positioned adjacent the nut member, said abutment member includes a projecting portion which is biased by the abutment member toward the nut member and engages the detent of the nut member for indicating to the operator an incremental cutting height adjustment of the mower deck, said abutment member further comprises a leaf spring member having the projecting portion coupled thereto, said leaf spring member serving to resiliently bias the projecting portion radially with respect to an axis of rotation of the nut member and toward the rotatable member and into engagement with the detent of the rotatable member, the nut member is operatively coupled with a link member coupled between a pair of beam members which form part of a four bar linkage for supporting the implement, and said link member adjusts the relative position of the beam members as the rotatable member is rotated by the operator to thereby adjust the operating height of the implement.

7. The invention of claim 6, wherein the detent is formed in a flange portion of the nut member.

8. The invention of claim 6, wherein a single detent is formed in the rotatable member such that the projecting portion engages the detent not more than once for each revolution of the rotatable member.

9. The invention of claim 8, wherein the link member further comprises a rod member rotatably and pivotally supported by one of the beams, and the rod member further includes a threaded portion operatively engaged with the other beam for altering the relative position of the, beams as the rod member rotates with the nut member.

10. The invention of claim 9, wherein the detent is formed in a flange portion of the nut member.

11. The invention of claim 8, wherein the link member is pivotally supported by one of the beams, and the link member further includes a threaded portion operatively engaged with the other beam for altering the relative position of the beams as the link member rotates with the nut member.

* * * * *